(12) United States Patent
Jean-Mary et al.

(10) Patent No.: US 8,738,636 B2
(45) Date of Patent: May 27, 2014

(54) ONTOLOGY ALIGNMENT WITH SEMANTIC VALIDATION

(76) Inventors: Yves Reginald Jean-Mary, Miami, FL (US); Mansur Kabuka, Miami, FL (US)

( * ) Notice: Subject to any disclaimer, the term of this patent is extended or adjusted under 35 U.S.C. 154(b) by 1252 days.

(21) Appl. No.: 12/561,839

(22) Filed: Sep. 17, 2009

(65) Prior Publication Data

US 2010/0131516 A1    May 27, 2010

Related U.S. Application Data

(60) Provisional application No. 61/098,591, filed on Sep. 19, 2008.

(51) Int. Cl.
*G06F 17/30* (2006.01)

(52) U.S. Cl.
CPC ................................ *G06F 17/30864* (2013.01)
USPC ............ 707/749; 707/736; 707/758; 717/143

(58) Field of Classification Search
USPC ........................... 707/749, 758, 736; 717/143
See application file for complete search history.

(56) References Cited

U.S. PATENT DOCUMENTS

2009/0037457 A1 * 2/2009 Musgrove ...................... 707/102
2009/0077094 A1 * 3/2009 Bodain ............................ 707/10
2009/0254574 A1 * 10/2009 De et al. ......................... 707/100

OTHER PUBLICATIONS

Yves R. Jean-Mary, Mansur R. Kabuka. "ASMOV: Ontology Alignment with Semantic Validation". Joint SWDB-ODBIS Workshop, Sep. 24, 2007, Vienna, Austria, 15-20.*

* cited by examiner

*Primary Examiner* — Shahid Alam
(74) *Attorney, Agent, or Firm* — Mark Terry

(57) ABSTRACT

The present invention relates to computer implemented methods and system for determining correspondences between terms in two or more ontologies. The methods and systems are designed to accept as inputs ontologies in Web Ontology Language (OWL) syntax or any other ontology syntax, to calculate a similarity measure between terms in the ontologies, extract an alignment based on this similarity measure, and verify this alignment according to the semantics contained in the ontologies. This process is designed to be executed iteratively until the similarity measures converge, or until another suitable finalization condition is met. The result of these methods and of the systems implementing these methods is an alignment between two or more ontologies establishing semantic correspondences between the terms in the ontologies.

16 Claims, 3 Drawing Sheets

ONTOLOGY ALIGNMENT WITH SEMANTIC VALIDATION

CROSS REFERENCE TO RELATED APPLICATION

This application claims the benefit under 35 U.S.C. §119 (e) of U.S. Provisional Patent Application No. 61/098,591, filed Sep. 19, 2008, which is hereby incorporated by reference herein in its entirety. This invention was made with government support under R43 RR018667 awarded by the National Institutes of Health (NIH). The government has certain rights in the invention.

This invention was made with government support under R43 RR018667 awarded by the National Institutes of Health (NIH). The government has certain rights in the invention.

FIELD OF THE INVENTION

The present invention generally relates to the alignment of ontologies. More particularly, the present invention relates to computer implemented methods and systems for determining correspondences between terms in two or more ontologies.

BACKGROUND OF THE INVENTION

An ontology $\mathcal{O}$ contains a set of entities related amongst themselves by different relations. Ontology entities can be divided in subsets as follows: classes, C, defines the concepts within the ontology; individuals, I, denotes the object instances of these classes; literals, L, represents concrete data values; datatypes, T, defines the types that these values can have; and properties, P, comprises the definitions of possible associations between individuals, called object properties, or between one individual and a literal, called datatype properties. Four specific relations form part of an ontology: specialization or subsumption, $\leq$; exclusion or disjointness, $\perp$; instantiation or membership, $\in$; and assignment, $=$.

The Web Ontology Language (OWL), a World Wide Web Recommendation, is a standardized formalism for representing ontologies. In particular, the OWL-DL sublanguage of OWL supports the representation of ontologies with maximum expressiveness without losing computational completeness and decidability, by restricting type separation so that the sets C, P, L, I, and T in the ontology are disjoint. The ASMOV alignment algorithm presented assumes that the ontologies to be aligned are expressed in OWL-DL.

The objective of ontology matching is to automatically derive an alignment between two ontologies, where an alignment consists of a set of correspondences between their elements. Given two ontologies, $\mathcal{O}$ and $\mathcal{O}'$, a correspondence between entities e in $\mathcal{O}$ and e' in $\mathcal{O}'$, which we denote as $\langle e, e' \rangle$, signifies that e and e' are deemed to be equivalent in some semantic sense.

Most work on ontology matching has focused on syntactic approaches, exploiting features including: terminological or lexical similarity between strings representing entities in ontologies; structural similarity at the level of ancestor-descendant and other relationships between entities; and extensional similarity, examining the data instances belonging to each ontology entity. Since entities in ontologies are intended to depict concepts and relationships with specific meaning, it is clear that correspondences found through ontology matching must abide by and be coherent with the formal semantics of the ontologies themselves.

Accordingly, it is desirable to derive systems and methods that fulfill these characteristics and that overcome existing deficiencies in the state of the art.

SUMMARY OF THE INVENTION

In accordance with the present invention, computer implemented methods and systems are provided for determining semantically meaningful correspondences between the terms in two ontologies.

In accordance with some embodiments of the present invention, in response to receiving two ontologies to be aligned, similarity calculations are performed on each pair of terms, one from each ontology. In some embodiments, a partial alignment determines initial correspondences between terms. The similarity calculations are multiple calculations along different measurements of similarity between terms; various embodiments of this invention use different weights to combine these measurements. The results of these similarity calculations are used to extract a pre-alignment. In some embodiments, this pre-alignment is processed through a mechanism of semantic verification, resulting in a verified alignment. Different embodiments may use different combinations of the semantic conditions to be verified. A finalization condition is evaluated on the verified alignment, where the process is repeated if the finalization condition is not met on the data.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are of the purpose of description and should not be regarded as limiting.

As such, those skilled in the art will appreciate that the conception, upon which this disclosure is based, may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and its various advantages, will be more apparent upon consideration of the following detailed description, taken in conjunction with the accompanying drawings, in which like reference characters refer to like parts throughout, and in which.

DETAILED DESCRIPTION OF THE INVENTION

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

Figure 1:
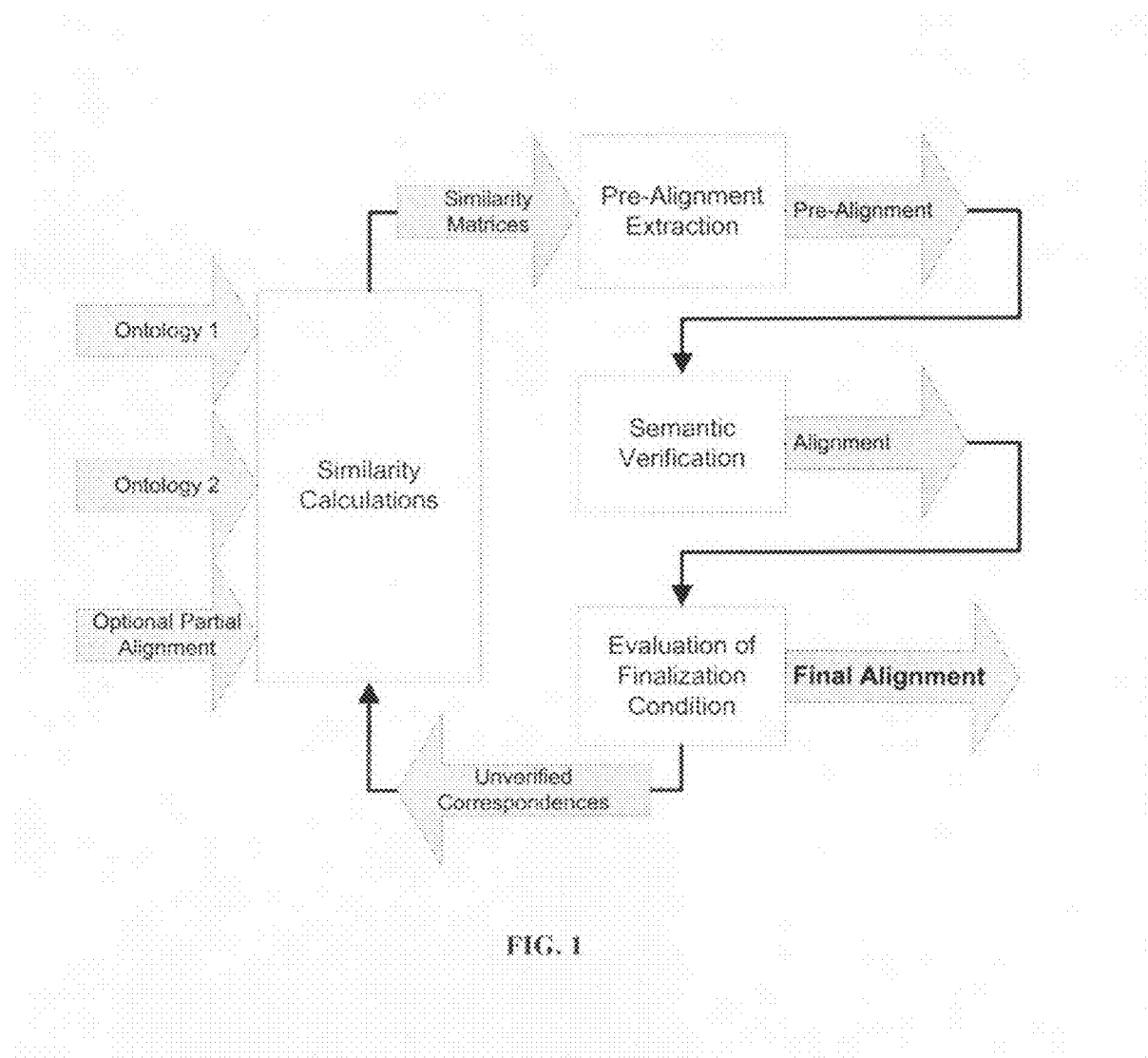
FIG. 1 is a simplified illustration of the process for derivation of an alignment between two ontologies according to some embodiments of the present invention.

FIG. 1 is an illustration of the ASMOV process. As shown in FIG. 1, this process consists of four specific parts: similarity calculations, pre-alignment extraction, semantic verification, and evaluation of finalization condition.

Similarity Calculations

Figure 2:
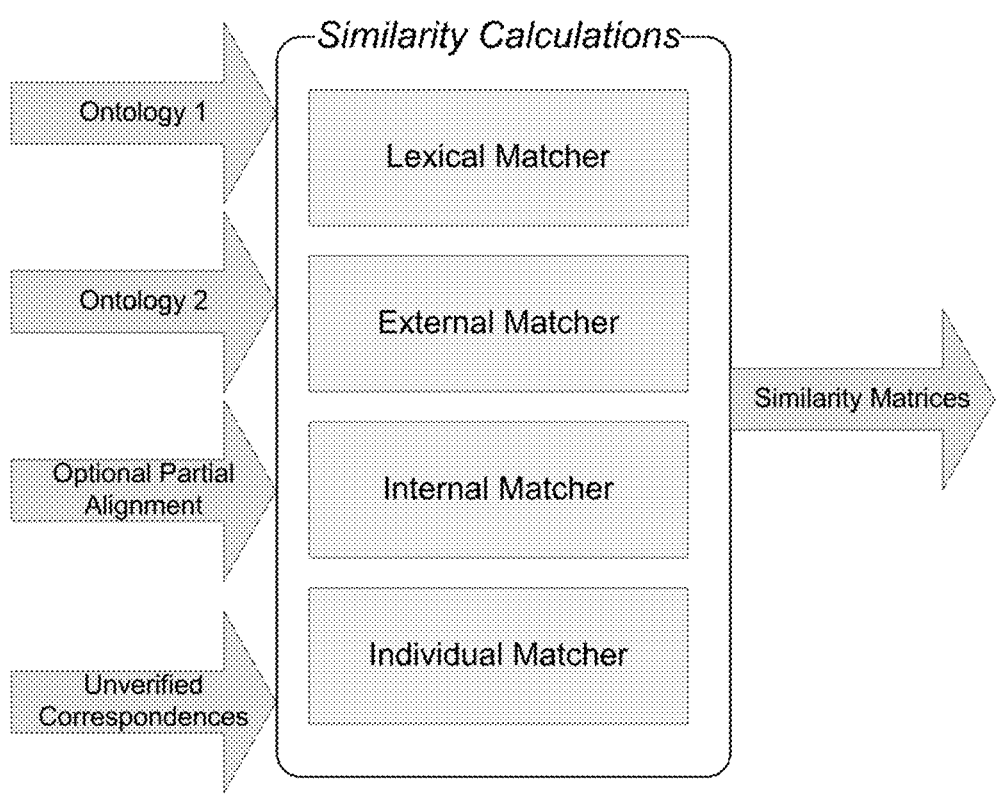
FIG. 2 is a simplified illustration of the process of similarity calculation between two ontologies, including the use of an optional partial alignment and the existence of invalid alignments, according to some embodiments of the present invention.
Figure 3:
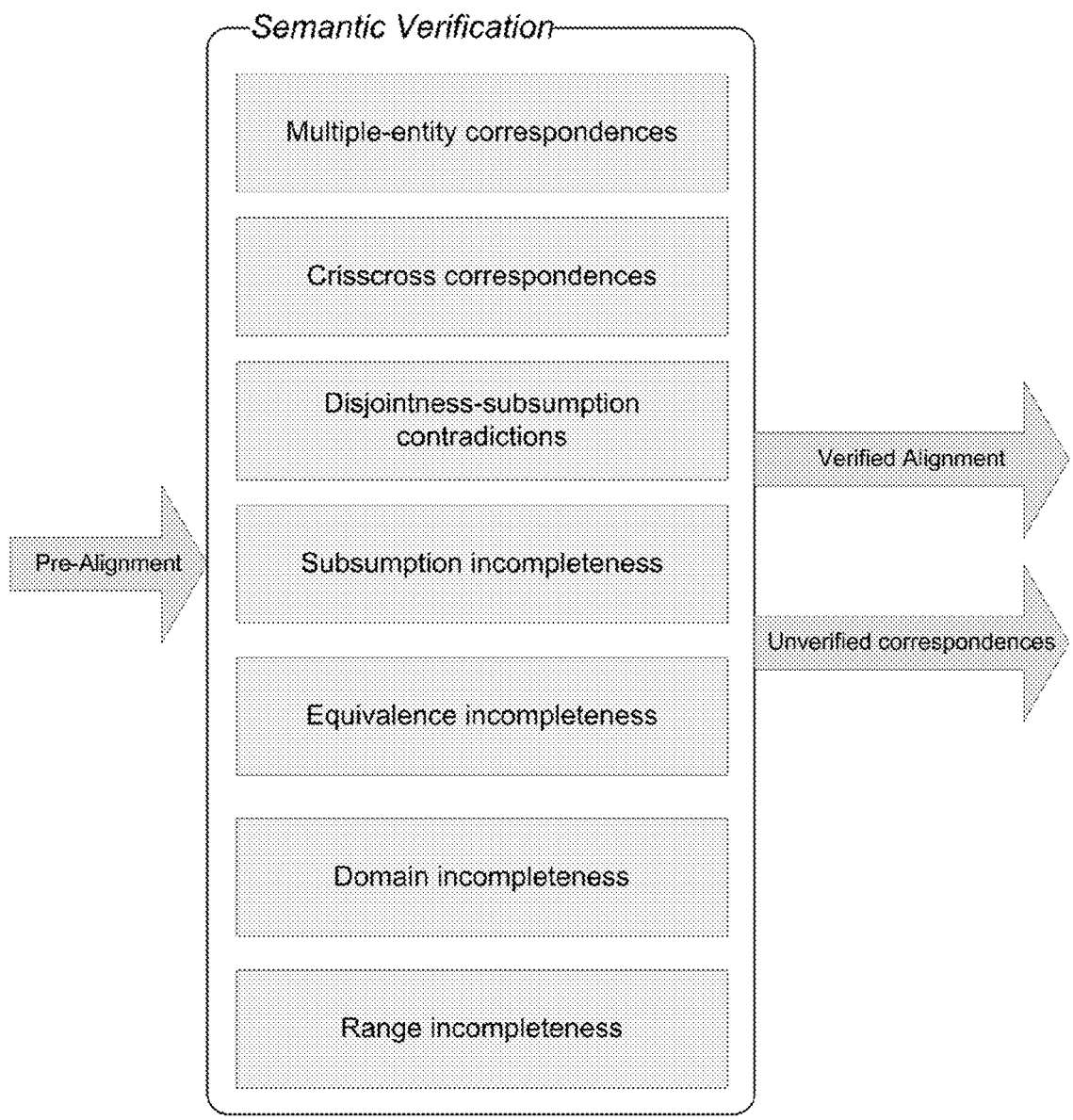
FIG. 3 is a simplified illustration of the process of semantic verification of an alignment, according to some embodiments of the present invention.

The ASMOV similarity calculation is based on the determination of a family of similarity measures which assess the likelihood of equivalence along three different ontology kinds of input. It uses a normalized weighted average of multiple similarities along different ontology facets. ASMOV evaluates similarities between entity sets, working from the OWL-DL ontologies to perform ad-hoc calculations designed specifically for each ontology facet. The ASMOV process also has a mechanism tolerant of the absence of any of these facets in the ontologies to be matched, by automatically readjusting the weights used in the weighted average calculation. ASMOV also is designed to accept an input alignment as a partial matching between the ontologies. FIG. 2 illustrates the similarity calculation process.

At each iteration k, for every pair of entities $e \in \mathcal{O}$, $e' \in \mathcal{O}'$, ASMOV obtains a calculated similarity measure $\sigma_k(e,e')$, as a weighted average of four similarities:

- a lexical (or terminological) similarity, $s^L(e,e')$, using either an external thesaurus or string comparison;
- two structural similarities:
  - a relational or hierarchical similarity $s^H_k(e,e')$, which uses the specialization relationships in the ontology; and
  - an internal or restriction similarity $s^R_k(e,e')$, which uses the established restrictions between classes and properties.
- an extensional similarity, $s^E_k(e,e')$, which uses the data instances in the ontology.

The lexical similarity does not vary between iterations and is therefore calculated only once, during pre-processing. Consider $F=\{L, E, H, R\}$ to be the set of similarity facets used in the calculation; $\sigma_k(e,e')$ is computed as $$\sigma_k(e, e') = \begin{cases} \dfrac{\sum_{f \in F}(w_f \cdot s_k^f(e, e'))}{\sum_{f \in F} w_f}, & \text{if } e \text{ and } e' \text{ are the same type of entity} \\ 0.0, & \text{otherwise;} \end{cases} \quad (1)$$

where $w_f$ are weights assigned to each of the features in the calculation.

If a given facet f is missing (e.g., if an entity in an ontology does not contain individuals), the corresponding similarity value $s^f_k$ is marked as undefined, and its weight $w_f$ is changed to zero.

In addition, ASMOV accepts an optional input alignment $A_o$ as a set of correspondences, $A_o=\{\langle e,e'\rangle\}$, where each correspondence in $A_o$ has a confidence value $n_0(e,e')$. This input alignment is used to supersede any similarity measures, defining a total similarity measure $s_k(e,e')$ as follows:

$$s_k(e, e') = \begin{cases} n_0(e, e'), & \text{if } \langle e, e' \rangle \in A_0 \\ \sigma_k(e, e'), & \text{otherwise} \end{cases} \quad (2)$$

The initial calculated similarity value between entities, $\sigma_0(e,e')$, is given by the lexical similarity between the entities multiplied by the lexical similarity weight. The total similarity measures for every possible pair of entities e in $\mathcal{O}$ and e' in $\mathcal{O}'$ define a similarity matrix $S_k=\{s_k(e,e')\}$ for each iteration k.

Lexical Similarity

The lexical feature space consists of all the human-readable information provided in an ontology. Three such lexical features are considered in OWL ontologies: the id, the label, and the comment. The lexical similarity measure is then calculated as the weighted average of the label, id, and comment similarities.

Lexical Similarity for Labels and Ids

Let the two labels being compared be l and l', belonging respectively to entities (classes or properties) e and e'. ASMOV is capable of working with or without an external thesaurus; if an external thesaurus is not used, only string equality is used as a measure. Let $\Sigma$ denote a thesaurus, and syn(l) the set of synonyms and ant(l) the set of antonyms of label l; the lexical similarity measure between the labels of e and e', $s^L(e,e')$, is then given as follows:

$$s^L(e, e') = \begin{cases} 1.0, & \text{if } l = l' \\ 0.99, & \text{if } l' \in syn(l) \\ 0.0, & \text{if } l' \in ant(l) \\ Lin(l, l'), & \text{if } l \in \Sigma \wedge l' \in \Sigma \wedge l' \notin syn(l) \\ \dfrac{|tok(l) \cap tok(l')|}{\max(|tok(l)|, |tok(l')|)}, & \text{otherwise.} \end{cases} \quad (3)$$

The similarity measure for synonyms is set slightly lower than the measure for actual string equality matches, in order to privilege exact matching between terms.

Lin(l,l') denotes an information-theoretic similarity between two concepts included within a thesaurus $\Sigma$, calculated as the probabilistic degree of overlap between two synonym sets, as follows:

$$Lin(l, l') = \max_{k; \exists c, c' \in \Sigma; l \in c \wedge l' \in c' \wedge c' \leq k} \dfrac{2\log(\pi(k))}{\log(\pi(l)) + \log(\pi(l'))} \quad (4)$$

where $\pi$ denotes the probability of occurrence of a concept in text.

The tokenization function tok(l) extracts a set of tokens from the label l, by dividing a string at punctuation and separation marks, blank spaces, and uppercase changes; when at least one of the labels to be compared is not found in the thesaurus, and if they are not exactly equal, the lexical similarity is computed as the number of overlapping tokens.

ASMOV optionally finds a lexical similarity measure between identifiers of entities e and e', $s^{id}(e,e')$, in the same way as with labels, except that the Lin function is not used; in case that the identifiers are not found to be synonyms or antonyms, the number of overlapping tokens is computed. In principle, identifiers in OWL are meant to be unique, and do not necessarily have a semantic meaning, and thus the similarity measurement is made to be more restrictive.

The lexical similarity measure $s^L(e,e')$ is designed to privilege labels (and ids) that can be found within the thesaurus used by the system. This design avoids influencing the matching process with similarities between identifiers that happen to share the same letters. Alternatively, non-language-based techniques, such as string edit distance or n-grams, may also be used either in substitution of the thesaurus nearness measure described above, or in combination with it using weighted averages.

Lexical Similarity for Comments

Comments are processed differently, since they usually consist of a phrase or sentence in natural language. In this case, we compute the similarity between the comments of entities e and e', $s^c(e,e')$, as a variation of Levenshtein distance but applied to tokens. First, an ordered set of tokens is obtained from the comment of each of the entities; then, we calculate the number of token operations (insertions, deletions, and substitutions of tokens) necessary to transform one of the comments into the other. Let x, x' be the comments of e, e' respectively, and let op(x,x') denote the number of token operations needed, and tok(x) denote the number of tokens in a comment, $$s^c(e, e') = 1 - \frac{op(x, x')}{\max(|tok(x)|, |tok(x')|)} \quad (4)$$

Entity Set Similarity

For the calculation of the structural and extensional similarities, in several cases it is necessary to determine a single similarity measure for sets of entities. Let E and E' be a set of entities from ontology $\mathcal{O}$ and $\mathcal{O}'$, and let S={s(e,e')} denote a matrix containing a set of similarity values from each e∈E, e'∈E'. The procedure to obtain this single measure for these sets is as follows:

First, a greedy selection algorithm is used to obtain a set of correspondences $A^S=\{\langle e_i,e'_j \rangle\}$. This algorithm iteratively chooses the largest $s(e_i,e'_j)$ in S and eliminates every other similarity for $e_i$ and $e'_j$ from S, until all $e_i$ or all $e'_j$ are eliminated.

Next, a similarity measure $s^{set}(E, E', S)$ is calculated using the following formula:

$$s^{set}(E, E', S) = \frac{2 \times \sum_{\langle e_i,e_j,s(e_i,e_j) \rangle \in A^S} s(e_i, e'_j)}{|E| + |E'|} \quad (5)$$

This normalization accounts for any difference in size between E and E'; some entities from the larger set will not have a correspondence and will reduce the overall similarity measure. Note that Eq. (5) will always yield values between 0 and 1, since the total number of correspondences in $A^S$ cannot be greater than the average size of the two sets E and E'.

Relational Similarity

The relational similarity is computed by combining the similarities between the parents and children of the entities being compared. As classes or properties may contain multiple parents and children, the similarity calculation is calculated as the average of the similarities of all parents or children, in order to restrict the results between 0 and 1.

Let e and e' be two entities belonging to ontologies $\mathcal{O}$ and $\mathcal{O}'$ respectively, and let U, U' be the sets of entities that are parents of e and e'. If the sets U and U' are both empty, the parent similarity measure between e and e' is undefined and ignored; if only one is empty, the measure is 0.0. Otherwise, we construct a parent similarity matrix $UP_{(k-1)}(e,e')$ containing the similarity measures at the (k-1)th iteration between each u∈U and u'∈U'. The parent similarity measure $s^U_k(e,e')$ for the kth iteration is then calculated as $s^{set}(U, U', UP_{(k-1)}(e,e'))$. A similar calculation is performed for the children sets, resulting in the children similarity measure $s^V_k(e,e')$.

The total relational similarity $s^H_k(e,e')$ is then calculated as the weighted sum of the parent and children similarity calculations; ASMOV typically uses equal weights for both sets, but asymmetrical weights are allowed. If both the parent and children similarity measure are undefined, then the total relational similarity itself is undefined and ignored. If one of them is undefined, then the other is used as the relational similarity.

The relational similarity between properties and between individuals is calculated in an analogous manner; in the case of individuals, the calculation considers the classes to which individuals are asserted members as their parents.

Internal Similarity for Properties

For properties, the internal similarity $s^R$ is calculated as a weighted sum of the domain and range similarities using equation (1). For the domain of all properties and for the range of object properties, the similarity is calculated as the similarity between the classes that define the domain and range. If these consist of the union of multiple classes, the best matched pair is used. Consider properties p and p', and let their domain be dom(p) and dom(p') respectively. Further, let dom(p)=($c_1 \cup \ldots \cup c_M$), and dom(p')=($c'_1 \cup \ldots \cup c'_N$). First, the pair ($c_m,c'_n$) with the highest similarity value at the (k-1)th iteration is chosen; note that if N=M=1, $c_m$=dom(p), $c_n$=dom(p'). The domain similarity for properties at the kth iteration is then given by $$s_k^{RD}(p,p')=s_{(k-1)}(c_m,c'_n) \quad (6)$$

The range similarity for object properties $s^{RR}(p,p')$ is calculated analogously. The total internal similarity for properties is then calculated as the weighted average between the domain and range similarities; ASMOV uses equal weights for both. To calculate the range similarity of two datatype properties p and p', Wu-Palmer similarity is calculated over the canonical taxonomy structure of XML Schema datatypes.

Internal Similarity for Classes

For classes, the internal similarity $s^R_k(c,c')$ for the kth iteration is calculated by taking into account the similarities of all local property restrictions associated to a class, considering the similarity between the properties themselves, and the cardinality and value restrictions for these properties. Let c and c' be two classes belonging to ontologies $\mathcal{O}$ and $\mathcal{O}'$, and let P(c) and P(c') be the sets of properties whose domain includes c and c' respectively. If both P(c) and P(c') are empty, the internal similarity between c and c' is undefined and ignored in the calculation of equation (1). Otherwise, for each pair of properties $p_m \in P(c)$ and $p'_n \in P(c')$, we calculate a property restriction similarity $s^{RP}_k(p_m,p'_n)$ as the weighted average of three values:

The first value, $s_{(k-1)}(p_m,p'_n)$, is the similarity between the two properties at the (k−1)th iteration.

The second value, $s^{card}(p_m,p_n)$, is a measure of the agreement in cardinality restrictions: if the two properties are restricted to the same minimum and maximum cardinality, this measure is 1.0, otherwise, it is 0.0.

The third value, $s^{value}(p_m,p'_n)$, is a measure of the similarity in value restrictions. Two types of value restrictions are considered: restrictions on particular property values, called enumerations, and restrictions on the class of the allowable values, which are called range restrictions. If one of the property value restrictions is defined as an enumeration of possible individual values, and the other is not, the value restriction similarity measure is 0.0. If both are enumerations, then this measure is calculated as the proportion of the enumerated individuals that match from one property restriction to another with respect to the total number of possible matches. If neither property being compared is restricted by enumerations, then their value restriction similarity measure is calculated by comparing the classes defined by the range restriction on the properties, as in the case of property internal similarity detailed above.

We then construct an property restriction similarity matrix $R_k(c,c')$, containing all $s^{RP}_k(p_m,p'_n)$ between each $p_m \in P(c)$ and $p'_n \in P(c')$, and calculate the relational similarity measure $s^R_k(c,c') = s^{set}(P(c), P(c'), R_k(c,c'))$.

Internal Similarity for Individuals

Let d.p denote the value of property p for individual d; the internal similarity $s^R_k(d,d')$ between two individuals d and d' is calculated by comparing the values of their properties, as follows:

For any two datatype properties p and p' with values for d and d' respectively, a value similarity $s^{value}_k(d, p, d', p')$ is set to $s_{(k-1)}(p,p')$, the total similarity between the properties at the previous iteration, if their corresponding values are lexically equivalent, otherwise it is set to undefined.

For any two object properties p and p' with values $\mathcal{O}$ and $\mathcal{O}'$ for d and d' respectively, a value similarity $s^{value}_k(d, p, d', p')$ is set to $s_{(k-1)}(\mathcal{O},\mathcal{O}')$, the total similarity between $\mathcal{O}$ and $\mathcal{O}'$ at the previous iteration.

The similarities between properties then define a matrix $S^{value}(d,d')$. Let P(d) and P'(d') be the sets of both datatype and object property values for d and d'; then the relational similarity between the individuals is calculated using the entity set similarity evaluation algorithm as $s^R_k(d,d') = s^{set}(P(d), P'(d'), S^{value}(d,d'))$.

Extensional Similarity Between Classes

The extensional similarity measure for two classes is calculated in the same way as the children hierarchical similarity. Let I(c) and I'(c') be the sets of individuals members of classes c and c', and let $IS_{(k-1)}(c,c')$ be the similarity matrix formed by the total similarity values for each pair of individuals $d \in I(c)$, $d' \in I(c')$. The extensional similarity measure for classes c and c' is then given by $s^D_k(c,c') = s^{set}(I(c), I(c'), IS_{(k-1)}(c,c'))$.

Extensional Similarity between Properties

To determine extensional similarity between properties, all individuals that contain a value for a given property are analyzed to determine a list of possible matches. Only properties which are both object or both datatype can have an extensional similarity; otherwise, the similarity is undefined.

Given two properties p in $\mathcal{O}$ and p' in $\mathcal{O}'$, let the sets I(p) and I(p') denote the set of individuals that contain one or more values for each property, and let I' denote the set of all individuals in $\mathcal{O}'$. Further, for a given individual d, let d.p denote the value of the property p for individual d. The individual similarity calculation is performed by finding a set of individual correspondences $B^D = \{\langle d.p, d'.p' \rangle\}$, $d \in I(p)$, $d' \in I'$. A correspondence belongs to $B^D$ if for p and p" object properties, $s_k(d.p,d'.p")$, the total similarity measure between individuals d.p and d'.p" at the previous iteration, is greater than zero.

for p and p" datatype properties, d.p and d'.p" are lexically equivalent.

A second set $A^D \subseteq B^D$, is obtained by restricting it to correspondences where the property at the second individual p"=p'. Then, the individual similarity between properties p and p', $s^D_k(p,p')$, is given by the ratio of the sizes of sets $A^D$ and $B^D$.

Pre-Alignment Extraction

In order to perform semantic verification, a pre-alignment $B_k$ is first extracted from the similarity matrix $S_k$ that results from the similarity calculations. This pre-alignment is obtained using a greedy algorithm as follows. A correspondence $\langle e, e' \rangle$ is inserted into the alignment $B_k$ if it has not been previously eliminated through the process of semantic verification, and if $s_k(e,e')$ is maximal to within a similarity threshold λ either for e or for e'; that is, if there does not exist an $e_i$ such that $\langle e_i, e' \rangle$ has not been eliminated and $|s_k(e_i,e') - s_k(e,e')| \le \lambda$, or there does not exist an $e'_j$ such that $\langle e, e' \rangle$ has not been eliminated and $|s_k(e,e'_j) - s_k(e,e')| \le \lambda$. Note that if two elements $e_a$ and $e_b$ have similarity values such that $|s_k(e_a,e') - s_k(e_b,e')| \le \lambda$, then both $\langle e_a, e' \rangle$ and $\langle e_b, e' \rangle$ are inserted into the pre-alignment.

Semantic Verification

The pre-alignment $B_k$ is then passed through a process of semantic verification, designed to verify that certain axioms inferred from an alignment are actually asserted in an ontology, removing correspondences that lead to inferences that cannot be verified. It is important to underline that the idea is not to find semantically invalid or unsatisfiable alignments, but rather to remove correspondences that are less likely to be satisfiable based on the information present in the ontologies.

Let $\mathcal{O}$ and $\mathcal{O}'$ be two ontologies, let $B_k$ be a pre-alignment between $\mathcal{O}$ and $\mathcal{O}'$, and let $B_{12} = \{\langle e_1,e'_1 \rangle, \langle e_2,e'_2 \rangle\}$ be an alignment consisting of a single pair of correspondences, $B_{12} \subseteq B_k$. Consider $\mathcal{O}^M$ to be an ontology defined by the merge of $\mathcal{O}$, $\mathcal{O}'$, and $B_{12}$, where the correspondences in $B_{12}$ are transformed into equivalence axioms. Suppose that an axiom α involving only entities in $\mathcal{O}$ can be inferred in $\mathcal{O}^M$ from the relations derived from the correspondences in $B_{12}$; $B_{12}$ is said to be verified in $\mathcal{O}$ if α is independently asserted by $\mathcal{O}$. If $B_{12}$ cannot be verified, the correspondence with the lowest confidence value is eliminated from $B_k$ and set in a list of removals, with the other correspondence stated as the cause for elimination; if both correspondences have the same measure, neither is eliminated.

Let $e_1$, $e_2$ be two distinct entities in $\mathcal{O}$, and $e'_1$, $e'_2$ distinct entities in $\mathcal{O}'$. The following kinds of inferences are examined by the ASMOV semantic verification process:

Multiple-Entity Correspondences: A multiple-entity correspondence occurs when an alignment contains both $\langle e_1,e'_1 \rangle$ and $\langle e_2,e'_1 \rangle$. Such an alignment implies that ($e_1=e_2$), so if this axiom is not asserted, the alignment cannot be verified.

Crisscross Correspondences: Suppose that $e_2 \le e_1$ and $e'_2 \le e'_1$. A crisscross correspondence occurs when an alignment contains both $\langle e_1,e'_2 \rangle$ and $\langle e_2,e'_1 \rangle$: $[(e_2 \le e_1) \wedge (e_1 = e'_2) \wedge (e_2 = e'_1) \wedge (e'_2 \le e'_1)]$ implies both ($e_1=e_2$) and ($e'_1=e'_2$). If both equivalences are not actually asserted in $\mathcal{O}$ or $\mathcal{O}'$ respectively, then the alignment cannot be verified.

Disjointness-Subsumption Contradiction: Suppose that $(e_2 \le e_1)$ and $(e'_2 \perp e'_1)$. If an alignment contains both $\langle e_1, e'_2 \rangle$ and $\langle e_2, e'_1 \rangle$, this implies $(e_2 \perp e_1)$ and $(e'_2 \le e'_1)$, which are both invalid and therefore cannot be verified. Note that since $(e_2 = e_1) \rightarrow (e_2 \le e_1)$, this also holds for equivalences.

Subsumption Incompleteness: If an alignment contains both $\langle e_1, e'_1 \rangle$ and $\langle e_2, e'_2 \rangle$, then $(e_2 \le e_1)$ and $(e'_2 \le e'_1)$ mutually imply each other; subsumption incompleteness occurs when one of the two is not asserted in its corresponding ontology.

Equivalence Incompleteness: If an alignment contains both $\langle e_1, e'_1 \rangle$ and $\langle e_2, e'_2 \rangle$, then $(e_2 = e_1)$ and $(e'_2 = e'_1)$ mutually imply each other; equivalence incompleteness occurs when one of the two is not asserted in its corresponding ontology.

Domain Incompleteness: Let c, c' be classes and p, p' be properties in $\mathcal{O}$ and $\mathcal{O}'$ respectively, let dom(p) denote the domain of a property p, and suppose c∈dom(p). If an alignment contains both $\langle c, c' \rangle$ and $\langle p, p' \rangle$, this implies (c'∈dom(p)); domain incompleteness occurs when this axiom cannot be verified.

Range Incompleteness: Let c, c' be classes and p, p' be properties in $\mathcal{O}$ and $\mathcal{O}'$ respectively, let rng(p) denote the range of a property p, and suppose c∈rng(p). If an alignment contains both $\langle c, c' \rangle$ and $\langle p, p' \rangle$, this implies (c'∈rng(p)); range incompleteness occurs when this axiom cannot be verified.

Every unverified correspondence is added to a list of removals; then, all existing unverified correspondences are checked to determine whether the cause of elimination subsists, removing correspondences from the list if the cause has disappeared. If at least one correspondence is newly unverified or at least one previously unverified correspondence has been removed from the list of removals, then a new pre-alignment is extracted from the existing similarity matrix, and the semantic verification process is restarted from this new pre-alignment. Otherwise, the semantically verified alignment $A_k$ and matrix $T_k$ are obtained, the first by removing all unverified correspondences from the pre-alignment $B_k$ provided as input to the semantic verification process, and the second by resetting to zero the similarity values of all unverified correspondences in the list of removals.

Evaluation of Finalization Condition

The semantically verified alignment $A_k$ and matrix $T_k$ are subjected to the evaluation of a finalization condition, in order to determine whether the algorithm should terminate, or whether a new iteration should be started by recomputing the similarity values. Two finalization conditions are potentially used to determine when the iterative process should stop.

The most stringent condition requires that the resulting matrix $T_k$ be repeated to within the same similarity threshold $\lambda$ used for pre-alignment extraction; that is, that for some iteration x<k, and for every $s_k(e,e')$ in $T_k$, $s_x(e,e')$ in $T_x$, $|s_x(e,e') - s_k(e,e')| \le \lambda$.

A less stringent condition requires that the resulting alignment be repeated, that is, that for some iteration x<k, $A_x = A_k$.

It is understood herein that the detailed description may be presented in terms of program procedures executed on a computer or network of computers. These procedural descriptions and representations are the means used by those skilled in the art to most effectively convey the substance of their work to other skilled in the art.

A procedure is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, the Internet, an Intranet, etc. Either of these may be implemented as a distributed computer system rather than a single computer. Moreover, the processing could be controlled by a software program on one or more computer systems or processors, or could even be partially or wholly implemented in hardware.

Portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C++, or any assembly language appropriate in view of the processor being used. It could also be written in an object-oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A computer implemented method for aligning ontologies, the method comprising:
    receiving two ontologies represented in their syntax;
    iteratively performing the following sequence until a finalization condition is met, thereby resulting in calculation of an alignment of the two ontologies:
    calculating a weighted average of one or more similarity measures between all pairs of terms, one from each ontology;
    extracting a pre-alignment based on the highest similarity between terms;
    performing a semantic verification over this pre-alignment to determine correspondences that cannot be semantically verified; and
    determining whether an alignment has been reached between the two ontologies.

2. The method of claim 1, wherein the two ontologies are represented using the Web Ontology Language.

3. The method of claim 1, wherein a partial alignment between the two ontologies is provided.

4. The method of claim 1, wherein an alignment is calculated for more than two ontologies, by calculating alignments between each pair of ontologies and then combining the alignments that have been calculated.

5. The method of claim 4, wherein a partial alignment between the more than two ontologies is provided.

6. The method of claim 1, wherein a similarity measure between the more than two ontologies is calculated as a weighted average of following similarity measures: a lexical or terminological similarity, a relational similarity, an internal similarity, and an extensional similarity.

7. The method of claim 6, wherein a partial alignment between the more than two ontologies is provided.

8. A computer implemented method for the semantic verification of an alignment between two or more ontologies, the method comprising:
    receiving two ontologies represented in their syntax;
    iteratively performing the following sequence until a finalization condition is met, thereby resulting in calculation of an alignment of the two ontologies:
    calculating a weighted average of one or more similarity measures between all pairs of terms, one from each ontology;
    extracting a pre-alignment based on the highest similarity between terms;
    performing a semantic verification over this pre-alignment to determine correspondences that cannot be semantically verified; and
    determining whether an alignment has been reached between the two ontologies;
    receiving the alignment between the two or more ontologies;
    verifying whether each correspondence in the alignment can be verified through other semantic information contained in the two or more ontologies;
    producing a list of invalid correspondences as those that could not be verified through semantic information in the two or more ontologies; and
    producing a new alignment without invalid correspondences.

9. The method of claim 8, wherein semantic verification includes a verification of multiple-entity correspondences.

10. The method of claim 8, wherein semantic verification includes a verification of crisscross correspondences.

11. The method of claim 8, wherein semantic verification includes a verification of disjointness-subsumption contradictions.

12. The method of claim 8, wherein semantic verification includes a verification of subsumption incompleteness.

13. The method of claim 8, wherein semantic verification includes a verification of equivalence incompleteness.

14. The method of claim 8, wherein semantic verification includes a verification of domain incompleteness.

15. The method of claim 8, wherein semantic verification includes a verification of range incompleteness.

16. A data processing system for aligning ontologies, the system comprising:
    a display device; and
    a processor configured to:
    receive two or more ontologies represented in their syntax;
    iteratively perform the following sequence until a finalization condition is met, thereby resulting in calculation of an alignment of the two ontologies:
    calculate a weighted average of one or more similarity measures between pairs of terms of the two or more ontologies;
    extract a pre-alignment based on the one or more similarity measures;
    perform semantic verification over the pre-alignment;
    iteratively execute the calculation of similarity measures, pre-alignment extraction, and semantic verification until a finalization condition is met; and
    determining whether an alignment has been reached between the two ontologies.

* * * * *